United States Patent [19]

Loren

[11] Patent Number: 4,942,006

[45] Date of Patent: Jul. 17, 1990

[54] METHOD OF AND APPARATUS FOR INJECTION MOLDING WITH PRESSURIZED-FLUID ASSIST

[75] Inventor: Norman S. Loren, Warren, Mich.

[73] Assignee: Michael Ladney, Sterling Heights, Mich.

[21] Appl. No.: 277,233

[22] Filed: Dec. 1, 1988

[51] Int. Cl.⁵ .................. B29C 45/00; B29C 45/34; B29C 45/76; B29C 67/20

[52] U.S. Cl. ........................... 264/50; 264/85; 264/237; 264/328.1; 264/328.8; 264/328.11; 264/572; 425/4 R; 425/146; 425/546; 425/559; 425/563; 425/564; 425/570; 425/812; 425/817 R

[58] Field of Search ............... 264/40.7, 50, 85, 101, 264/102, 237, 255, 328.1, 328.8, 572, 328.11, 572; 425/4 R, 110, 130, 146, 546, 557, 559, 562, 563, 564, 570, 812, 817 R

[56] References Cited

U.S. PATENT DOCUMENTS

| | | | |
|---|---|---|---|
| 3,966,372 | 6/1976 | Yasuike et al. | 425/4 R |
| 4,101,617 | 7/1978 | Friederich | 264/572 |
| 4,106,887 | 8/1978 | Yasuike et al. | 425/4 R;4 X |
| 4,129,635 | 12/1978 | Yasuike et al. | 264/45.5 |
| 4,140,672 | 2/1979 | Kataoka | 264/45.1 |
| 4,333,608 | 6/1982 | Hendry | 425/146 X |

*Primary Examiner*—Jeffery Thurlow
*Assistant Examiner*—Leo B. Tentoni

*Attorney, Agent, or Firm*—Brooks & Kushman

[57] ABSTRACT

An injection molding method and nozzle for use therein wherein first and second variable pressures are applied to a piston of a valve mechanism of the nozzle so that a differential fluid pressure on the piston causes a tip portion of the valve mechanism to alternately open and close. In this way, the tip portion communicates the flow of resin from a nozzle body of the nozzle to an injection aperture of a mold. Differential pressure on the piston prevents a fluid which distributes the molten resin over the interior surfaces of the mold from entering the flow path of the molten resin in the nozzle body. The fluid preferably is a gas, such as nitrogen. Preferably, the piston is mounted for reciprocating movement within the nozzle body and the first pressure is provided by the resin during resin injection and the second pressure is partially applied by the nitrogen gas. Preferably, the valve mechanism includes a counterbalance mechanism which is set to prevent fluid entry into the mold until the tip portion of the valve mechanism is closed. The resulting article is then cooled to a temperature below the softening point of the resin, the pressure is relieved within the article and the mold is opened to remove the article. The nozzle may also be utilized in making structural foam articles from a foamable resin. The pressure within the mold is relieved to permit foaming by the foamable resin after injection of the foamable resin.

39 Claims, 5 Drawing Sheets

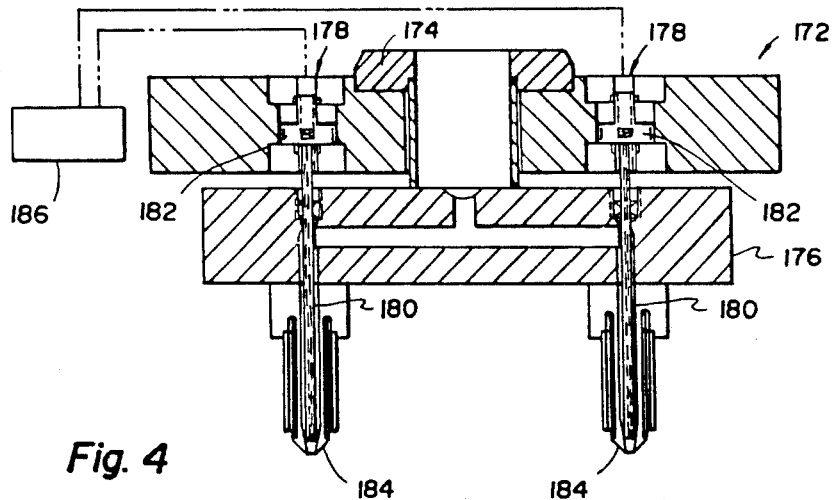
Fig. 4
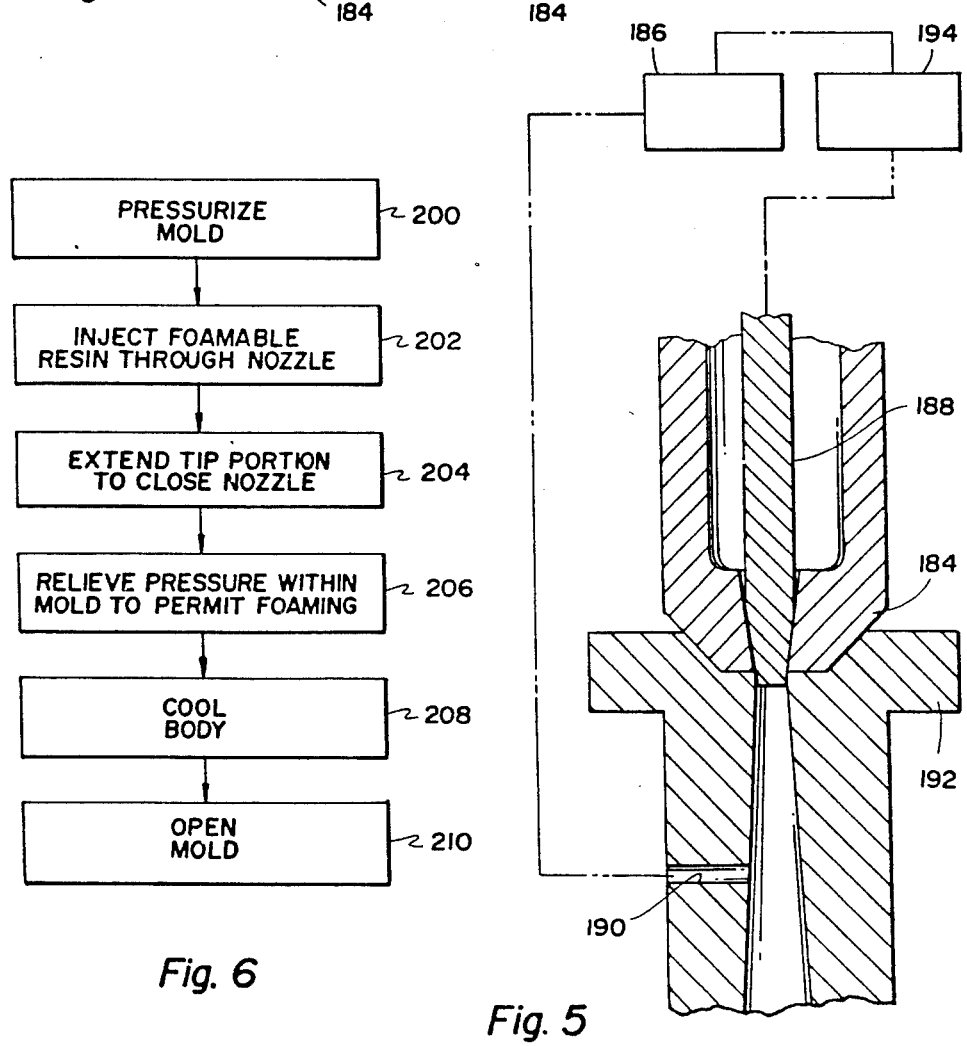
Fig. 6
Fig. 5

METHOD OF AND APPARATUS FOR INJECTION MOLDING WITH PRESSURIZED-FLUID ASSIST

CROSS-REFERENCE TO RELATED APPLICATIONS

This application is a C-I-P of Ser. No. 133,925 filed Dec. 16, 1987, now abandoned.

TECHNICAL FIELD

This invention relates to injection molding methods and nozzles for use therein and, in particular, to injection molding methods and nozzles for use therein wherein hollow-shaped articles as well as structural foam articles can be produced thereby.

BACKGROUND ART

It is well known in the plastic molding art to use pressurized fluid in conjunction with the injection molding of articles. The pressurized fluid is typically nitrogen gas which is introduced into the molten plastic.

Pressurized fluid serves many purposes. First, it allows the article so formed to have hollow interior portions which result in weight and material savings. Secondly, it minimizes the molded-in stresses by eliminating high second stage injection pressure. This also reduces part weight in that the gas is used to fill out the part. Thirdly, the pressurized fluid applies outward pressure to force the plastic against the surfaces of the mold cavity while the article is setting up. This enhances surface quality by eliminating sink marks, especially in areas of the article having thicker plastic sections, such as structural ribs or bosses.

One problem associated with fluid assisted injection molding is that the gas and the plastic are confluent within the injection nozzle. This causes the plastic within the nozzle to become contaminated with the gas. This is highly undesirable since a later injection of plastic into the mold contains contaminated plastic which results in poor quality. In other words, the gas mixes with the molten plastic in the nozzle and the resulting resin affects the quality of the product surface.

One prior art attempt to solve this problem is disclosed in the Yasuike U.S. Pat. No. 4,106,887 which discloses an injection molding nozzle similar to the injection molding nozzle disclosed in the Kataoka U.S. Pat. No. 4,140,672. A check valve is disposed within a longitudinally extending fluid passage to prevent the injected material from reversing. The problem with such prior art is insufficient force required to completely close the nozzle, especially when a relatively high viscous plastic is injected by the nozzle.

The Friederich U.S. Pat. No. 4,101,617 discloses a method for injection molding of hollow-shaped bodies including a nozzle for introducing both gas and molten resin into a mold. A valve is reciprocable within the nozzle to control the flow of gas and molten resin into the mold.

The Hendry U.S. Pat. No. 4,333,608 discloses an injection molding nozzle, including a shut-off plunger, which is operated by a fluid and which is opened by the flow of plasticized material through the nozzle. A control rod external to the nozzle controls the movement of the shut-off plunger and is adjustable so that the amount of plasticized resin flowing through the nozzle can be controlled.

The Kataoka U.S. Pat. No. 4,140,672 discloses an injection molding nozzle and method wherein a needle-type nozzle is provided with a central duct for injecting viscous liquid into a mold cavity.

The Yasuike U.S. Pat. No. 3,966,372 discloses a nozzle including an injection cylinder having a movable mandrel contained therein. The mandrel divides the bore of the cylinder into two different chambers. The mandrel has a central passage which extends axially therethrough so that the rear and front chambers are communicated. First and second thermoplastic resins are charged into the nozzle and are consequently injected in a mass into a mold cavity.

The Yasuike U.S. Pat. No. 4,129,635 discloses an injecting cylinder including a nozzle portion. The nozzle portion includes an injecting passage within which is located a gas charging device which, in turn, is provided with a charging nozzle which opens through the injecting passage.

DISCLOSURE OF THE INVENTION

A specific object of the present invention is to provide an improved method and nozzle for use therein for making at least one article from plastic resin by injection molding wherein the flow of molten resin through the nozzle is controlled by a differential fluid pressure on a piston of the nozzle.

In carrying out the above object and other objects of the present invention a method for making an article from at least one plastic resin in an injection molding system is provided. The system includes a pressurized fluid source, a mold having an injection aperture and an injection nozzle having a nozzle body for establishing a flow path for molten resin through the injection aperture and a valve mechanism including a piston and a tip portion operatively associated with the piston to move therewith. The tip portion has a closed position and an open position to communicate the flow of plastic resin from the nozzle body through the injection aperture. The method includes the steps of injecting an amount of molten resin sufficient for the preparation of the article by applying a first variable pressure to the piston to cause the tip portion to move to its open position to thereby communicate the flow of plastic resin from the injection nozzle through the injection aperture of the mold. Simultaneously with or after the step of injecting the molten resin, pressurized fluid from the fluid source is communicated to the mold to distribute the molten resin over the interior surfaces of the mold whereby a hollow body portion is formed. A second variable pressure is applied to the piston to urge the tip portion towards its closed position. A difference in the pressure between the first and second pressures causes the tip portion to move to its closed position. The differential pressure on the valve means prevents the fluid from entering the flow path of the molten resin in the nozzle body. The article is cooled to a temperature beneath the softening point of the resin, the pressure within the hollow body portion is relieved and, finally, the mold is opened to remove the article. Pressurized fluid from the fluid source applies at least a portion of the second pressure to urge the tip portion towards its closed position.

The nozzle for use in the system has a first end adapted for resin connection with the mold and a second end being adapted for resin connection with an end of an associated injection molding machine. The valve mechanism is adapted for reciprocating movement between the open and closed positions of the tip portion.

The piston has first and second surfaces. The tip portion moves between the open and closed positions by the pressure difference to prevent the fluid from entering the flow path of the resin in the nozzle body. The second surface of the piston is adapted to be in communication with pressurized fluid from the fluid source to urge the tip portion towards its closed position and to maintain the tip portion in the closed position.

The invention may be utilized in a method for making a structural foam article from a foamable resin.

The invention may also be utilized in applications where it is desirable to communicate and/or relieve the fluid pressure downstream from the nozzle.

The advantages accruing to the method and nozzle of the present invention are numerous. For example, the invention may be utilized in a multi-nozzle, hot runner manifold system to provide dual but separate paths for controlling the sequential injection of plastic and gas to form a molded article having at least one hollow interior portion. This is particularly advantageous since in many cases the shape or dimension of the molded article is relatively large and best produced by multiple injection points. The use of such multiple injection points also minimizes the requirement of pushing or forcing a molten plastic from a single injection point to the extreme portions of the cavity. The problem with the use of a single nozzle relates to the increase of viscosity in proportion to the distance which the plastic has to travel to the extreme area of the molten cavity.

Furthermore, the gas flow path is quickly isolated from the plastic flow path within the nozzle in a convenient structure. In any event, the gas path is separated from the molten plastic path, thereby avoiding problems attendant when having a common flow path for both the gas and the plastic within a nozzle.

Preferably, the passages for the plastic and the gas are coaxial wherein the respective passages are not confluent. Also, preferably, the valve mechanism for controlling the passage of plastic also has formed therein a secondary passage for the flow of the gas. The valve mechanism preferably includes a counterbalance mechanism which is set to prevent fluid entry into the mold until the tip portion of the valve mechanism is closed.

Still preferably, the method and nozzle are useful either in a single nozzle or a multi-nozzle hot runner manifold in which one or more of the nozzles is equipped with the features of the present invention.

The objects, features and advantages of the present invention are readily apparent from the following detailed description of the best mode for carrying out the invention when taken in connection with the following drawings.

BRIEF DESCRIPTION OF THE DRAWINGS

FIG. 4 is a sectional view of a second embodiment of the nozzle of the present invention in combination with a hot runner manifold adapted for use with multiple nozzles;

FIG. 5 is a schematic view, partially broken away and in cross-section, of yet another embodiment of the nozzle of the present invention;

FIG. 6 is a block diagram illustrating the various steps of a second embodiment of the method of the present invention.

BEST MODES FOR CARRYING OUT THE INVENTION

Figure 1:
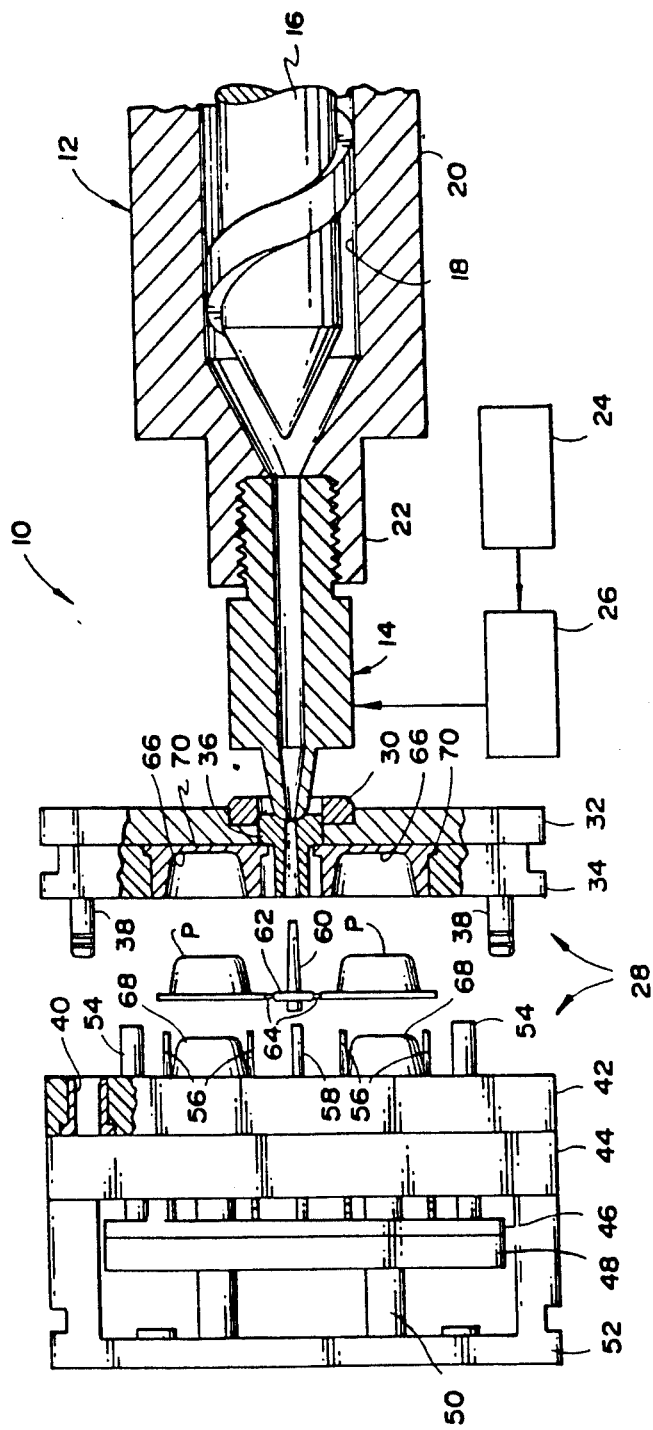
FIG. 1 is a schematic view, partially broken away and in cross-section, of a conventional fluid-injection molding system including a mold in its open position, a source of pressurized fluid and associated control valve and an injection molding machine having a nozzle.
Figure 2:
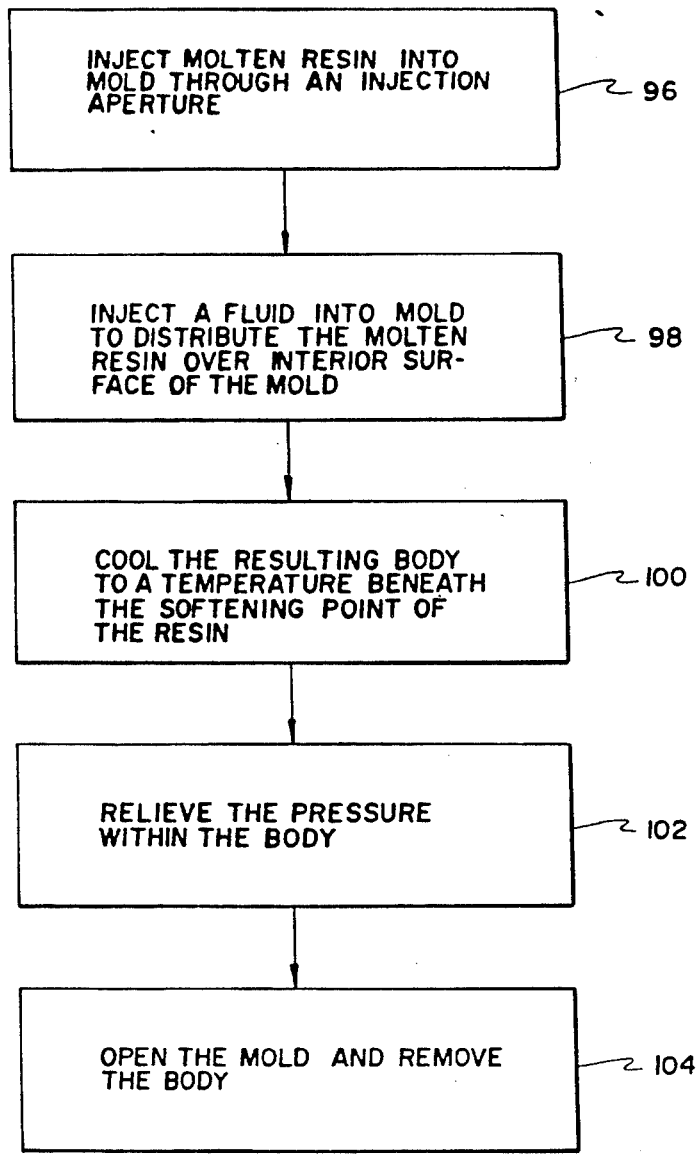
FIG. 2 is a block diagram illustrating the various steps of one embodiment of the method of the present invention.

Referring now to FIG. 1, there is illustrated a conventional gas-assisted injection molding system, generally indicated at 10, for making a plastic article from a plastic resin. A general understanding of the different components of the system 10 is useful in understanding the method and system of the present invention.

Briefly, the injection molding system 10 includes an injection molding machine, generally indicated at 12, having a nozzle, generally indicated at 14, for injecting predetermined amounts or shots of molten resin. The injection molding machine 12 includes a hydraulic screw ram 16 which is disposed in a bore 18 formed in a barrel 20 of the injection molding machine 12. The ram 16 plasticizes and advances resin towards the nozzle 14. Upon complete plasticization of the resin, the screw ram 16 is hydraulically advanced towards the end portion 22 of the barrel 20 to inject molten plastic through the nozzle 14 as is well known in the art.

The system 10 also includes a pressurized fluid supply 24 which supplies pressurized fluid, (i.e. typically nitrogen gas), to the nozzle 14 through a fluid control valve or valves 26. The valve 26 controls the flow of pressurized fluid from the fluid supply 24 in synchronization with the injection of molten plastic from the nozzle 14, as is also well known in the art. It is to be understood that timing and sequence of steps needed to coordinate the plastic injection and the fluid communication may be provided by any of a wide variety of structures.

The system 10 further includes a mold or a mold body, generally indicated at 28. As illustrated in FIG. 1, the mold 28 comprises a two-plate mold body. One of the plates includes a locating ring 30 for locating the injection end of the nozzle 14. The locating ring 30 is mounted on a clamp plate 32 which, in turn, is fixedly connected to a cavity retainer plate or cavity plate 34. A sprue bushing 36 is disposed within the locating ring 30 and is supported by the clamp plate 32.

Leader pins 38 on the cavity plate 34 provide the male half of the male/female connection of the first plate with the second plate of the two-plate mold 28. In particular, the second plate includes leader pin bushings 40 (only one of which is shown) which slidably receive and retain the leader pins 38 therein in the closed position of the mold 28. The leader pin bushings 40 are retained within a core retainer plate 42. The core retainer plate 42 is fixedly connected to a support plate 44 which, in turn, is connected to an ejector retainer plate 46. The ejector retainer plate 46 is connected to an ejector plate 48 which, in turn, is supported by support pillars 50. The support plate 44 is also fixedly connected to the ends of the U-shaped ejector housing 52 to which the support pillars 50 are also connected.

The plate 46 supports a plurality of return pins 54, ejector pins 56 and a sprue puller pin 58 which extend towards the plate 34 and through the plates 42 and 44. The ejector pins 56 are provided for ejecting parts P formed within the mold 28. The sprue puller pin 58 is aligned with the sprue bushing 36.

As illustrated in FIG. 1, the articles P are interconnected by a sprue 60, a runner 62 and gates 64 which define a resin flow path from the sprue bushing 36 to cavities 66. Opposing surfaces of male and female mold parts 68 and 70, respectively, define the cavities 66. The mold parts 68 are supported on the plate 46 and the mold parts 70 are supported on the cavity retainer plate 34.

Figure 3:
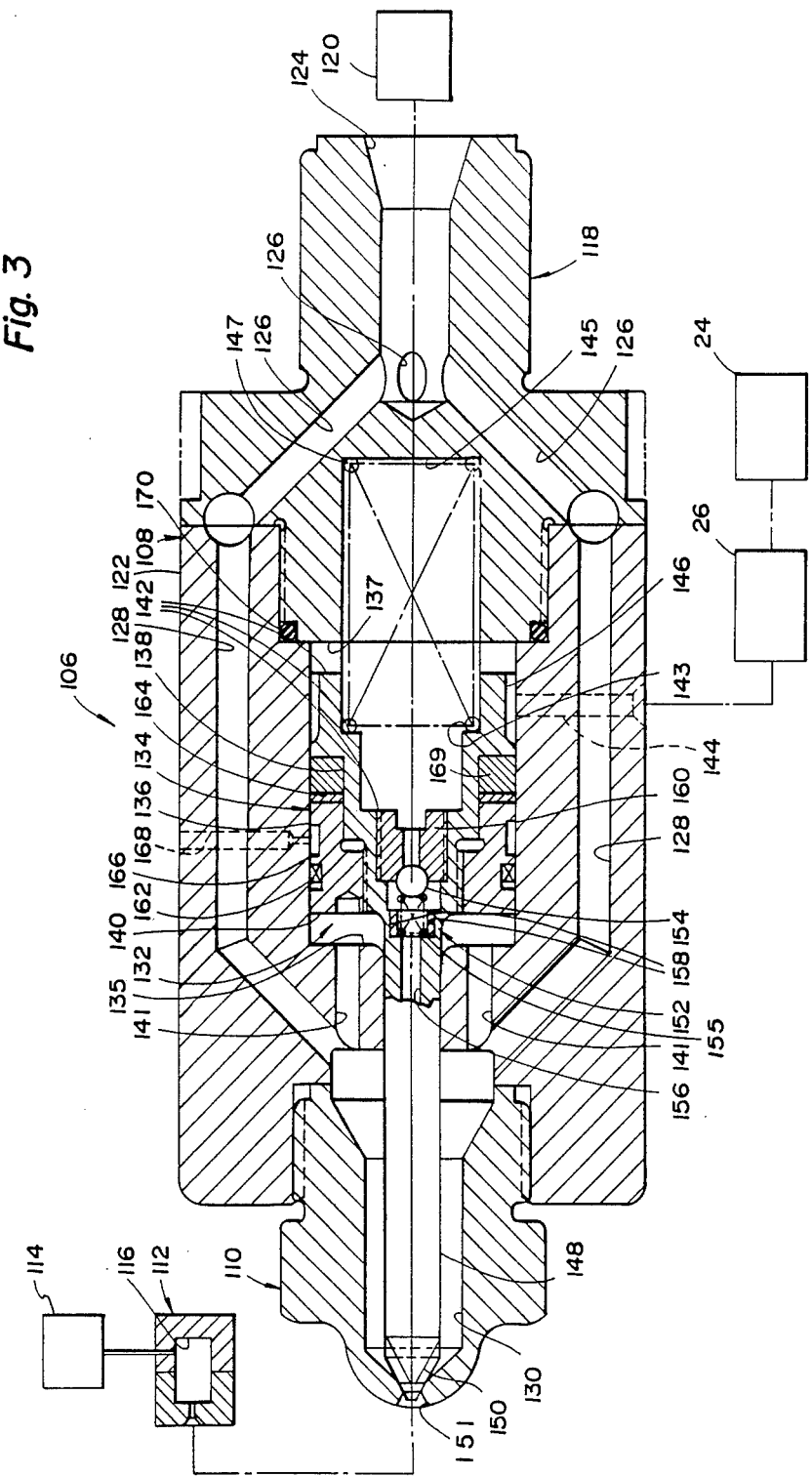
FIG. 3 is a side view, partially broken away and in cross-section of a first embodiment of a nozzle of the present invention.

Referring now to FIG. 3, there is illustrated an embodiment of a nozzle of the present invention. In particular, the nozzle, generally indicated at 106, includes a nozzle body, generally indicated at 108 which, in turn, includes a threaded first end portion, generally indicated at 110. The first end portion 110 is adapted for resin connection with an associated mold, generally indicated at 112. The mold 112 may be prepressurized and/or relieved through a pressure source 114 which is in communication with the mold cavity 116 of the mold 112, the purpose of which will be described in greater detail hereinbelow. However, preferably, the mold 112 is prepressurized through the nozzle 106. The mold 112 may include a female mold portion and a male mold portion movable within the female mold portion to define therein a mold cavity having a variable volume. Molten resin injected into the mold 112 at least partially fills the mold cavity. The volume of the mold cavity is increased on injection thereinto of the fluid during the fluid injection step.

The nozzle body 108 also includes a threaded second end portion 118 which is adapted for resin connection with an end of an associated injection molding machine 120. The first and second end portions 110 and 118, respectively, are threadedly secured to a central portion 122 therebetween to form the nozzle body 108.

The first and second end portions 110 and 118, respectively, and the central portion 122 establish a resin flow path for the molten resin between the injection molding machine 120 and the mold 112. The second end portion 118 includes a central resin aperture 124 which branches off into auxiliary resin apertures 126 within the second end portion 118. The auxiliary resin apertures 126 communicate with respective resin apertures 128 formed in the central portion 122 which, in turn, communicate a second central resin aperture 130 in the first end portion 110.

A valve means or mechanism, generally indicated at 132, is disposed within the nozzle body 108 for controlling the flow of resin through the nozzle body 108. The valve mechanism 132 includes a piston or piston assembly, generally indicated at 134, which is adapted for reciprocating movement within the central portion 122. Even though the rest of the valve mechanism 132 is shown in its closed position for purposes of clarity, the piston assembly 134 is shown in FIG. 3 at a location substantially midway between surfaces 135 and 137 of the central portion 122 and the second end portion 118, respectively.

The piston assembly 134 includes a first piston part 136 in which there is threadedly secured a second piston part 138. The first piston part 136 has a surface 140 which is in communication with the molten resin via passages 141 extending from the second aperture 130 and through the central portion 122. Likewise, the second piston part 138 has surfaces 142 in communication with the fluid supply 24 through the fluid control valve 26 and a hole 144 formed radially through the central portion 122 and in communication with an outer circumferential groove 146 formed in the second piston part 138.

The second piston portion 138 has a shoulder portion 143 and the second end portion 118 has a face 145 for receiving and retaining a spring 147 therebetween. The spring 147 biases the piston 134 towards the left as illustrated in FIG. 3.

The second piston part 138 is integrally formed with a pin 148 having a tip portion 150. The tip portion 150 is movable between the solid and phantom line positions illustrated in FIG. 3 to alternately open or close a resin orifice 151 formed in the first end portion 110. The first end portion 110 is preferably interchangeable with other end portions to vary the size of the resin orifice.

At the juncture between the pin 148 and the second piston portion 138, there is disposed a check valve, generally indicated at 152, including a ball 154 biased by a spring 155 to control the flow of the gas through a longitudinally extending passage 156 which extends completely through the pin 148. In particular, the ball 154 prevents reverse flow of gas through the pin 148. However, it is to be understood that the check valve 152 may be omitted if it is desired to relieve the pressure within the hollow body portion through the nozzle.

The spring 155 is seated within an apertured ring 158 at one end of thereof and biases the ball 154 at its opposite end. The ball 154 seats against an apertured plug 160 which is threadedly secured within the piston portion 138. The ball 154 allows the flow of the gas through the apertured ring 158 immediately adjacent the aperture 156 after the force of the fluid from the fluid supply 24 has overcome the biasing action of the spring 155. The force-deflection characteristics of the spring 155 are chosen so that the ball 154 remains seated against the plug 160 while the piston assembly 134 moves the pin 148 to its closed position. Only when the pin 148 is in its closed position does the fluid force unseat the ball 154.

A sealing means or mechanism in the form of various annular backup and sealing rings 162, 164, 169 and 170 are provided for further preventing the communication of the gas and the resin within the nozzle body 108. Furthermore, between the rings 162 and 164 a circumferential groove 166 is formed in the first piston part 136 which is in communication with a bleed hole 168 to bleed off any gas that may bypass the ring 164.

During operation of the nozzle 106 the tip portion 150 moves from its closed position to its open position due to the variable pressure exerted by the molten resin at the surface 140 of the first piston part 136. The molten resin is then allowed to flow through the nozzle 106, through the sprue and into the mold cavity 116. After resin injection, the pin 148 advances to move the tip portion 150 to its closed position under the biasing action of the spring 147 and the fluid pressure at the ball 154. After the tip portion 150 is in its closed position, additional pressure exerted by the gas unseats the ball 154 from the plug 160 and the gas flows through the aperture 156 in the pin 148. The gas injection or communication step may be accomplished through a valving arrangement controlled by timers or other process control parameters as is well known in the art.

When the injection of the gas charge is completed, the gas valve 26 is closed and the gas is held in the article within the mold. The check valve 152 prevents the reverse flow of gas through the pin 148. The small surface area of the tip portion 150 relative to the large surface area at the surfaces 142 prevents the opening of the nozzle 106 by any flow of gas to the tip portion 150. In other words, the pressure differential on the valve mechanism 132 ensures that the gas does not contaminate the molten resin in the nozzle body 108.

Finally, the gas is relieved from the mold 112. The gas may be relieved in any number of alternative ways. One possibility is to permit the gas to vent through the path through which it entered. With respect to this possibility, the check valve 152 would not be needed. Alternatively, the gas may be vented within the mold downstream of the tip portion 150. Also, the method may include the step of injecting an amount of molten resin into the hollow body portion formed within the mold. The hollow body portion is typically formed with a fluid entry opening therein. The method may also include the step of injecting an amount of resin sufficient to close the fluid entry opening in the hollow body portion.

Referring now to FIG. 4 there is illustrated a valve gate or a conventional multi-nozzle hot runner manifold system 172 which is modified to utilize the invention of the present application. In this type of design there are multiple entry points for the plastic to form the molded article. Such a system is utilized in many cases, where the shape or dimensions of the molded article are relatively large and best produced by multiple injection points.

The system 172 includes a locating ring 174, a manifold 176 and a pair of cylinder assemblies, generally indicated at 178. Each of the cylinder assemblies 178 includes a shutoff pin 180 which has a longitudinally extending passage extending completely therethrough for gas injection.

Each of the assemblies 178 includes a piston 182 secured at one end of its respective pin 180 to move therewith. Piston reciprocation caused by gas from a control gas source 186 causes the pin 180 to reciprocate to open and close its respective nozzle 184. When the shutoff pin 180 is in its retracted position, the nozzle 184 is open and permits communicable plastic to flow through the sprue and into the mold cavity. When the shutoff pin is in its advanced or sealing position, the nozzle tip is closed. After the nozzle tip is closed, the air may flow in a controlled fashion from the controlled gas source 186 to distribute the molten resin over the interior surfaces of the mold. As can be readily appreciated, one or more of the nozzles 106 can be easily adapted to be threadedly attached to the manifold 176. In such a configuration, the piston 134 would preferably be located outside of the nozzle body 108 and take the place of the piston 182.

Referring now to FIG. 5, there is illustrated an alternative embodiment to the embodiment illustrated in FIG. 4 wherein solid pins 188 are provided in place of the hollow pins 180. The controlled gas source 186, rather than supplying gas through the pin 188, supplies gas downstream from the nozzle 184 such as through an aperture 190 extending through a sprue 192 of the mold. However, it is to be understood that the gas may be supplied at any convenient location downstream from the nozzle 184. The gas from the gas source 186 is also communicated to an actuating means or mechanism 194 which preferably takes the form of a piston within a cylindrical member in order to extend or retract the pin 188.

Referring now to FIG. 6, there is illustrated in flowchart form the various process steps for making a structural foam body from a foamable resin in an injection molding system which includes the nozzle 106 of FIG. 3.

In step 200, the mold 112 is pressurized via the pressure source 114.

In step 202, the foamable resin is injected through the nozzle 106.

In step 204, the tip portion 150 is extended to close the nozzle 106.

In step 206, pressure is relieved within the mold 112 to permit foaming of the foamable resin.

In step 208, the body is cooled.

In step 210, the mold is opened and the part is removed.

In addition to the steps outlined in FIG. 6, fluid (i.e. nitrogen gas) may be injected into the mold 112 under pressure from the nozzle 106 to distribute the molten resin over the interior surfaces of the mold 112. After this step, the resulting pressure from the gas is relieved. The pressure may be relieved in the mold or may be relieved through the hollowed-out pin 148.

Figure 7:
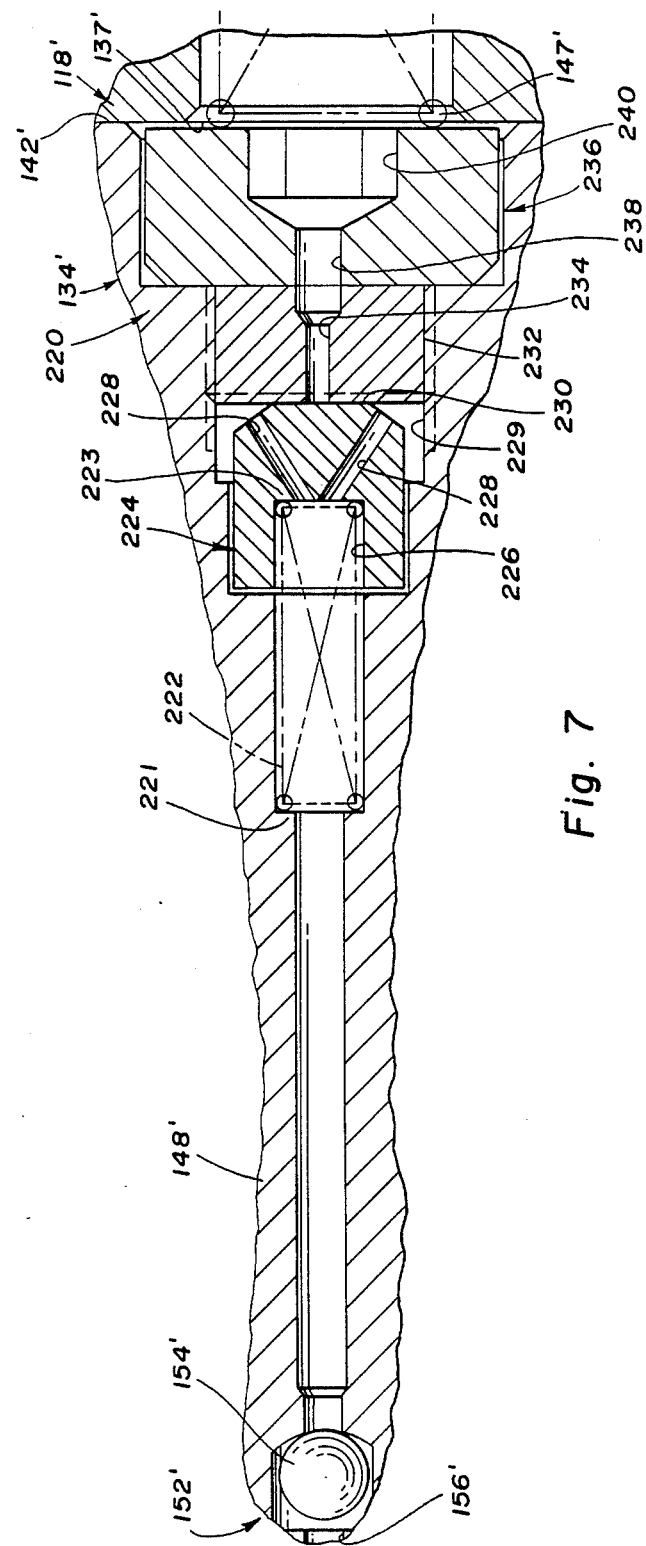
FIG. 7 is a side view, partially broken away and in cross section, of a counterbalance mechanism for use in a preferred embodiment of the nozzle of the present invention.

Referring now to FIG. 7, there is illustrated an enlarged form of a counterbalance means or mechanism, generally indicated at 220, which is located within a piston assembly, generally indicated at 134, In general, the counterbalance mechanism 220 also prevents fluid entry into the mold 112 until a tip portion of the valve mechanism 132 is closed.

It is to be understood that the parts of FIG. 7 having the same or similar functions or construction to the parts illustrated in FIG. 3 are given the same reference numerals, but have a prime designation.

The piston assembly 134' is integrally formed with a pin 148', having a tip portion (not shown, but which is threadedly secured to the end of the pin 148')

Included within the pin 148' is a check valve, generally indicated at 152', similar to the check valve 152. The check valve 152' includes a ball 154' disposed within the pin 148,, adjacent the passage 156' formed in the removable tip portion.

The counterbalance mechanism 220 includes a compression spring 222, seated between a shoulder 221 formed in the pin 148' and a shoulder 223 of a spring support, generally indicated at 224, which is located in the pin 148'. The spring support 224 includes an inner cavity 226 which receives the spring 222 and which is at least partially defined by the shoulder 223. The cavity 226 is in fluid communication with a second cavity 229 formed in the pin 148' by means of inclined passages 228.

The passages 228 communicate with an exterior surface 230 of the spring support 224 opposite the internal cavity 226. In turn, the exterior surface 230 communicates via passages 234, 238 and 240 with surfaces 142' and 137' of the piston assembly 134' and a second end portion 118' of the nozzle, respectively. The passage 234 is formed in an adjustment plug 232 and is in direct communication with the passage 238 formed in the adjustment plug 232 as well as in a pressure block, generally indicated at 236. Finally, the passage 240 is formed in the pressure block 236 in direct communication with the passage 238.

Both the size of the passage 234 and the strength of the spring 222 determine the pressure at which the fluid travels through the passage 156'. For example, the smaller the diameter of the passage 234 and the stronger the spring 222, the higher the pressure. Such high pressure is required for high viscous plastics.

The adjustment plug 232 is adjustably, threadedly secured within the piston assembly 134' to thereby set the spring 222 of the counterbalance mechanism 220 to prevent gas entry into in the mold until the piston tip is seated closed in its forward position. In other words, air pressure, together with spring 147' applies a pressure at the surface 142' to move the piston assembly 134' and, consequently, the pin 148' to the left until the tip portion of the pin 148' is seated closed. After seating, the air pressure appearing at the surface 230 of the spring support 224 urges the spring support 234 to the left, thereby allowing the fluid to flow through the apertures 234, 238 and 240 through apertures 228, past the spring 222 and through the passage 156' and the pin 148'. The ball 154' operates in the same fashion as the ball 154 in the embodiment of FIG. 3 by allowing the fluid to flow unimpeded to the mold, but preventing the fluid from flowing back through the passage 156' (i.e. the ball 154' operates as a one-way valve).

Again, it is to be understood that the check valve 152' may be omitted if it is desired to at least partially relieve the pressure within the hollow body portion through the nozzle. The counterbalance mechanism 220 permits such relieving to occur at least until the pressure within the hollow body portion reaches an amount such as 400 psi, at which pressure the counterbalance mechanism 220 prevents the reverse flow of fluid.

The methods and various embodiments of the nozzle of the present invention prevent intermixing of the gas and plastic resin within the nozzle. Consequently, parts having excellent surface finish may be provided by the present invention.

While the best mode for carrying out the invention has herein been described in detail, those familiar with the art to which this invention relates will recognize various alternative designs and embodiments for practicing the present invention as defined by the following claims.

What is claimed is:

1. A method for making an article from at least one plastic resin having a softening point in an injection molding system including a pressurized fluid source, a mold having an injection aperture and interior surfaces, an injection nozzle having a nozzle body for establishing a flow path or molten resin through the injection aperture and valve means including a piston and a tip portion operatively associated with the piston to move therewith, the tip portion having a closed position and an open position to communicate the flow of plastic resin from the nozzle body through the injection aperture, the method including the steps of: (a) injecting an amount of molten resin for the article by applying a first variable pressure to the piston to cause the tip portion to move to its open position to communicate the flow of plastic resin from the injection nozzle through the injection aperture in the mold; (b) communicating pressurized fluid from the fluid source to the mold, to distribute the molten resin over the interior surfaces of the mold whereby a hollow body portion is formed; (c) applying a second variable pressure to the piston to urge the tip portion towards its closed position, a difference in the pressure between the first and second pressures causing the tip portion to move to its closed position, wherein the difference in pressure on the valve means prevents the fluid from entering the flow path of the molten resin in the nozzle body; (d) cooling the article to a temperature beneath the softening point of the resin; (e) relieving the pressure within the hollow body portion; and (f) opening the mold to remove the article wherein the improvement comprises:

pressurized fluid from the fluid source applies at least a portion of the second variable pressure to urge the tip portion towards its closed position.

2. The method as claimed in claim 1 further comprising the step of injecting an amount of molten resin into the hollow body portion.

3. The method as claimed in claim 1 wherein the piston is mounted for reciprocating movement within the nozzle body, the first pressure being provided by the resin during the resin injection step.

4. The method as claimed in claim 1 wherein the piston is mounted for reciprocating movement outside the nozzle body.

5. The method as claimed in claim 1 wherein the fluid is communicated through the injection aperture.

6. The method as claimed in claim 5 wherein the fluid is communicated through the tip portion.

7. The method as claimed in claim 1 wherein the pressure within the hollow body portion is relieved through the injection aperture.

8. The method as claimed in claim 7 wherein the pressure within the hollow body portion is at least partially relieved through the tip portion.

9. The method as claimed in claim 7 or claim 8 wherein the step of relieving the pressure is at least partially accomplished by separating the nozzle and the mold after the step of cooling.

10. The method as claimed in claim 1 wherein the fluid is a gas.

11. The method as claimed in claim 10 wherein the gas is nitrogen.

12. The method as claimed in claim 1 wherein the valve means includes a biasing means, the biasing means applying at least a portion of the second pressure.

13. The method as claimed in claim 1 wherein the fluid applies substantially all of the second pressure during said step of communicating.

14. The method as claimed in claim 1 wherein the hollow body portion is formed within the mold with a fluid entry opening therein, and wherein the method further comprises the step of injecting an amount of resin sufficient to close the fluid entry opening in the hollow body portion.

15. The method as claimed in claim 14 wherein the step of relieving is accomplished by opening the interior of the hollow body portion to ambient atmosphere after the step of cooling.

16. The method as in claim 1 or claim 14 wherein the mold defines therein a mold cavity of fixed volume having a form of the article to be formed therein and wherein the molten resin injected into the mold initially only partially fills the mold cavity.

17. The method as in claim 1 or claim 14 wherein said mold includes a female mold portion and a male mold portion movable within the female mold portion to define therein a mold cavity of variable volume and wherein the molten resin injected into the mold at least partially fills the mold cavity.

18. The method as in claim 17 wherein the volume is increased on injection thereinto of the fluid.

19. The method as claimed in claim 1 wherein the pressurized fluid is communicated to the mold downstream from the nozzle.

20. The method as claimed in claim 1 or claim 19 wherein the pressure within the hollowbody portion is at least partially relieved downstream from the nozzle.

21. A nozzle for use in a fluidassisted injection molding system including a pressurized fluid source, a mold having an injection aperture and an injection molding machine, the nozzle including a nozzle body having means for establishing a flow path for molten resin, a first end of the nozzle body being adapted for resin connection with the mold and a second end thereof being adapted for resin connection with an end of the injection molding machine; valve means for controlling the flow of resin through the nozzle body, the valve means including a piston and a tip portion operatively associated with the piston to move therewith, the valve means being adapted for reciprocating movement between an open position and a closed position, the tip portion communicating the flow of resin through the nozzle body in he open position, said piston having first and second surfaces, the tip portion moving between the open and closed positions by a pressure difference on the valve means to prevent the fluid from entering the flow path of the molten resin in the nozzle body and wherein the improvement comprises:

the second surface of the piston is adapted to be in communication with pressurized fluid from the fluid source to urge the tip portion towards its closed position and to maintain the tip portion in the closed position.

22. The nozzle as claimed in claim 21 wherein the valve means is housed within the nozzle body and the first surface of the piston is in communication with the resin.

23. The nozzle as claimed in claim 21 wherein the piston is mounted for reciprocating movement outside of the nozzle body and wherein fluid from the fluid source applies pressure to the first surface of the piston.

24. The nozzle as claimed in claim 21 or claim 22 or claim 23 wherein the valve means has a fluid passage formed therein and open at one end thereof through the tip portion, the fluid passage and the tip portion communicating the flow of pressurized fluid into the mold.

25. The nozzle as claimed in claim 22 or claim 23 wherein the fluid is a gas.

26. The nozzle as claimed in claim 25 wherein the gas is nitrogen.

27. The nozzle as claimed in claim 22 or claim 23 wherein said valve means further includes biasing means for biasing the piston.

28. The nozzle as claimed in claim 27 wherein the biasing means includes a spring operatively associated with the second surface of the piston to bias the piston.

29. The nozzle as claimed in claim 24 further comprising a check valve disposed in the fluid passage for regulating the flow of pressurized fluid therethrough.

30. The nozzle as claimed in claim 22 or claim 23 wherein the nozzle is adapted for use in a multi-nozzle hot runner manifold system.

31. The nozzle as claimed in claim 22 or claim 23 wherein said tip portion is operatively associated with the first end of the nozzle body to define a resin orifice of the nozzle.

32. The nozzle as claimed in claim 31 wherein the nozzle body includes an interchangeable first end and a common tip portion to vary the size of the resin orifice.

33. The nozzle as claimed in claim 22 or claim 23 further comprising sealing means disposed within the nozzle body or preventing the communication of the fluid and the resin within the nozzle body at the piston.

34. The nozzle as claimed in claim 21 or claim 22 or claim 23 wherein said valve means includes a counterbalance mechanism to prevent fluid entry into the mold until the tip portion of the valve means is closed.

35. The nozzle as claimed in claim 34 wherein said counterbalance mechanism includes spring means for applying a spring force, the spring force being larger than that required to move the tip portion to its closed position.

36. A method for making a structural foam article from a foamable resin having a softening point in an injection molding system including a pressurized fluid source, a mold having interior surfaces and an injection nozzle having a nozzle body for establishing a flow path for molten resin and a valve means having a piston and a tip portion operatively associated with the piston to move therewith, the method comprising the steps of: (a) pressurizing the mold to a predetermined pressure; (b) injecting an amount of foamable resin sufficient for at least partial preparation of the article from the injection nozzle through an injection aperture in the mold, the resin being in communication with a first surface of the piston to cause the tip portion to move towards its open position; (c) causing the piston to move by differential pressure at the valve means to thereby move the tip portion to its closed position; (d) relieving the pressure within the mold to permit foaming by the resin; (e) cooling the article to a temperature beneath the softening point of the resin; and (f) opening the mold to remove the article wherein the improvement comprises:

pressurized fluid from the fluid source applies at least a portion of the differential pressure to urge the tip portion towards its closed position.

37. The method as claimed in claim 36 further comprising the step of injecting a fluid into the mold under pressure to distribute the molten resin over the interior surfaces of the mold.

38. The method as claimed in claim 37 further comprising the step of further relieving the pressure within the article after the step of injecting the fluid.

39. The method as claimed in claim 38 wherein the valve means has a fluid passage formed therein and wherein the step of further relieving is accomplished by venting the pressure within the mold through the fluid passage.

* * * * *